(12) United States Patent
Uno et al.

(10) Patent No.: US 11,440,583 B2
(45) Date of Patent: Sep. 13, 2022

(54) HYDRAULIC DRIVE DEVICE FOR INDUSTRIAL VEHICLE

(71) Applicant: KABUSHIKI KAISHA TOYOTA JIDOSHOKKI, Kariya (JP)

(72) Inventors: Takashi Uno, Aichi-ken (JP); Naoya Yokomachi, Aichi-ken (JP); Yuki Ueda, Aichi-ken (JP); Tsutomu Matsuo, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 327 days.

(21) Appl. No.: 16/759,495

(22) PCT Filed: Oct. 5, 2018

(86) PCT No.: PCT/JP2018/037316
§ 371 (c)(1),
(2) Date: Apr. 27, 2020

(87) PCT Pub. No.: WO2019/087687
PCT Pub. Date: May 9, 2019

(65) Prior Publication Data
US 2020/0283061 A1    Sep. 10, 2020

(30) Foreign Application Priority Data

Oct. 30, 2017  (JP) .............................. JP2017-209654

(51) Int. Cl.
*F16D 31/00*   (2006.01)
*F15B 13/00*   (2006.01)
(Continued)

(52) U.S. Cl.
CPC ............... *B62D 5/065* (2013.01); *B62D 5/07* (2013.01); *B62D 5/08* (2013.01); *B66F 9/22* (2013.01);
(Continued)

(58) Field of Classification Search
None
See application file for complete search history.

(56) References Cited

U.S. PATENT DOCUMENTS 4,573,319 A     3/1986   Chichester
7,287,375 B2 *  10/2007  Goto .......................... B66F 9/22
                                                        60/468
(Continued)

FOREIGN PATENT DOCUMENTS

JP    1991-204375 A    9/1991
JP    2009-019660 A    1/2009
JP    2010-111344 A    5/2010

*Primary Examiner* — Adam D Tissot
(74) *Attorney, Agent, or Firm* — Sughrue Mion, PLLC

(57) ABSTRACT

A hydraulic drive device for an industrial vehicle includes a variable displacement pump, a displacement control valve, a power steering cylinder, a power steering valve, a loading cylinder, a loading valve, a hydraulic oil passage, and a pilot line. The displacement control valve controls the variable displacement pump to increase displacement of the variable displacement pump when differential pressure between discharge pressure of hydraulic oil discharged from the variable displacement pump and pilot pressure generated in the pilot line is smaller than a predetermined set pressure. A spool of the loading valve is provided with a groove portion that forms a communication passage that makes communication between the hydraulic oil passage and the pilot line at a neutral position of the loading valve when the power steering valve is located in a neutral position.

4 Claims, 3 Drawing Sheets

(51) Int. Cl.
    *F15B 11/00*     (2006.01)
    *B62D 5/065*    (2006.01)
    *B62D 5/07*     (2006.01)
    *B62D 5/08*     (2006.01)
    *B66F 9/22*     (2006.01)

(52) U.S. Cl.
    CPC ....... *F15B 2211/40* (2013.01); *F15B 2211/78* (2013.01)

(56) References Cited

U.S. PATENT DOCUMENTS

2017/0328382 A1* 11/2017 Amrhein ............. F15B 11/0423
2019/0040879 A1*  2/2019 Ueda ................... F15B 13/0403

* cited by examiner

HYDRAULIC DRIVE DEVICE FOR INDUSTRIAL VEHICLE

CROSS REFERENCE TO RELATED APPLICATIONS

This application is a National Stage of International Application No. PCT/JP2018/037316 filed Oct. 5, 2018, claiming priority based on Japanese Patent Application No. 2017-209654 filed Oct. 30, 2017, the contents of all of which are incorporated herein by reference in their entirety.

TECHNICAL FIELD

The present invention relates to a hydraulic drive device for an industrial vehicle.

BACKGROUND ART

As a hydraulic drive device for an industrial vehicle, for example, a technique described in Patent Literature 1 is known. The hydraulic drive device described in Patent Literature 1 includes a hydraulic pump driven by a traveling drive engine, a fully hydraulic power steering device including a steering control valve, a steering cylinder, and the like, a loading device including a lift operation valve that operates a lift cylinder and a tilt operation valve that operates a tilt cylinder, a priority flow control valve that branches hydraulic oil supplied from the hydraulic pump via a supply passage to the power steering device with priority and branches surplus hydraulic oil to the loading device, and a back pressure valve that is disposed in a return passage for branching the hydraulic oil discharged from the hydraulic pump from the supply passage and returning it to a tank, and controlling pressure of the hydraulic oil supplied to the priority flow control valve.

CITATION LIST

Patent Literature

Patent Literature 1: Japanese Patent Application Publication No. 2010-111344

SUMMARY OF INVENTION

Technical Problem

If the hydraulic pump is a variable displacement pump, displacement of the variable displacement pump (hereinafter referred to as pump displacement) is controlled by a displacement control valve. The displacement control valve controls the variable displacement pump, for example, to increase the pump displacement when differential pressure (hereinafter, LS differential pressure) between discharge pressure of the hydraulic oil discharged from the variable displacement pump and pilot pressure (load sensing pressure: LS pressure) generated in the power steering device is lower than a set pressure. Such a hydraulic drive device has the following problems when the steering wheel is turned back.

Specifically, when turning back the steering wheel is started, a power steering valve (steering control valve) temporarily becomes a neutral state (closed state), so that the pilot pressure is not generated in the power steering device and the LS differential pressure reaches or exceeds the set pressure. Thus, the displacement control valve controls the variable displacement pump to reduce the pump displacement. For this reason, the flow rate of the hydraulic oil discharged from the variable displacement pump decreases, and the power steering valve opens to the opposite side in a state where the discharge pressure of the hydraulic oil discharged from the variable displacement pump decreases. As a result, the power supplied to a power steering cylinder is insufficient, and the operation of the steering wheel becomes heavy, ie, a so-called heavy steering state. Thereafter, the pilot pressure is generated in the power steering device, so that the LS differential pressure falls below the set pressure and the displacement control valve controls the variable displacement pump to increase the pump displacement. Therefore, the flow rate of the hydraulic oil discharged from the variable displacement pump increases, and the discharge pressure of the hydraulic oil discharged from the variable displacement pump increases. Thus, the insufficiency of the power supplied to the power steering cylinder is eliminated to eliminate the heavy steering state. As described above, when a driver turns back the steering wheel, the driver feels a momentary catch due to a heavy steering.

An object of the present invention is to provide a hydraulic drive device for an industrial vehicle that makes it possible to prevent a driver from feeling a catch in turning back a steering wheel.

Solution to Problem

A hydraulic drive device for an industrial vehicle according to an aspect of the present invention includes a variable displacement pump that discharges hydraulic oil, a displacement control valve that controls the variable displacement pump, a power steering cylinder that is driven by the hydraulic oil discharged from the variable displacement pump, a power steering valve that is disposed between the variable displacement pump and the power steering cylinder to switch directions in which the hydraulic oil flows according to an operation state of a steering wheel, a loading cylinder that is driven by the hydraulic oil discharged from the variable displacement pump, a loading valve that is disposed between the variable displacement pump and the loading cylinder to switch directions in which the hydraulic oil flows according to an operation state of a loading operation lever, a first hydraulic oil passage that connects the variable displacement pump and the power steering valve and through which the hydraulic oil discharged from the variable displacement pump flows, a second hydraulic oil passage that connects the variable displacement pump and the loading valve and through which the hydraulic oil discharged from the variable displacement pump flows, and a pilot line that connects the loading valve and the displacement control valve. The hydraulic drive device is characterized in that the displacement control valve controls the variable displacement pump to increase displacement of the variable displacement pump when differential pressure between discharge pressure of the hydraulic oil discharged from the variable displacement pump and pilot pressure generated in the pilot line is smaller than a predetermined set pressure and in that a spool of the loading valve is provided with a groove portion that forms a communication passage that makes communication between the second hydraulic oil passage and the pilot line at a neutral position of the loading valve when the power steering valve is located in a neutral position.

In such a hydraulic drive device, when the steering wheel is operated, the hydraulic oil discharged from the variable displacement pump is supplied to the power steering cylinder through the first hydraulic oil passage and the power steering valve to thereby drive the power steering cylinder. When the loading operation lever is operated, the hydraulic oil discharged from the variable displacement pump is supplied to the loading cylinder through the second hydraulic oil passage and the loading valve to thereby drive the loading cylinder.

Here, the spool of the loading valve is provided with the groove portion that forms the communication passage that makes communication between the second hydraulic oil passage and the pilot line at the neutral position of the loading valve when the power steering valve is located in the neutral position. Therefore, even if the steering wheel is turned back to temporarily locate the power steering valve in the neutral state, the second hydraulic oil passage and the pilot line communicate with each other through the communication passage in the loading valve, so that a desired pilot pressure is generated in the pilot line. At this time, the displacement control valve controls the variable displacement pump to increase the displacement of the variable displacement pump when the differential pressure between the discharge pressure of the hydraulic oil discharged from the variable displacement pump and the pilot pressure generated in the pilot line is smaller than the set pressure. Therefore, when the desired pilot pressure is generated in the pilot line, the differential pressure between the discharge pressure of the hydraulic oil discharged from the variable displacement pump and the pilot pressure generated in the pilot line falls below the set pressure to thereby secure the displacement of the variable displacement pump. As a result, the flow rate of the hydraulic oil discharged from the variable displacement pump is secured to secure the discharge pressure of the hydraulic oil discharged from the variable displacement pump. Therefore, when the power steering valve is opened from the neutral state to the opposite side, power supplied to the power steering cylinder is secured. This prevents the driver from feeling a catch when the driver turns back the steering wheel.

The hydraulic drive device for the industrial vehicle may further include a switching valve that is disposed between the variable displacement pump, and the power steering valve and the loading valve, and is switched to any one of a position for supplying the hydraulic oil from the variable displacement pump to the power steering valve mainly through the first hydraulic oil passage, and a position for supplying the hydraulic oil from the variable displacement pump to the power steering valve and the loading valve through the first hydraulic oil passage and the second hydraulic oil passage.

In such a structure, when the switching valve is located at a position where the hydraulic oil from the variable displacement pump is supplied to the power steering valve mainly through the first hydraulic oil passage, the hydraulic oil leaking from the switching valve is supplied to the loading valve through the second hydraulic oil passage. In this case, it is easy to perform operation of slightly moving the loading cylinder by fine operation of the loading operation lever.

It may be so arranged that the loading cylinder is a lift cylinder, the loading valve is a lift valve disposed between the variable displacement pump and the lift cylinder, and the groove portion is provided in the spool of the lift valve.

Since the structure of the lift valve is relatively simple, it is easy to form the groove portion in the spool of the lift valve.

The hydraulic drive device for the industrial vehicle may further include a shuttle valve that is disposed between the power steering valve and the loading valve, and the displacement control valve, and a first input pilot line that connects the shuttle valve and the power steering valve. The pilot line may include a second input pilot line that connects the shuttle valve and the loading valve, and an output pilot line that connects the shuttle valve and the displacement control valve. The shuttle valve may output higher pilot pressure of the pilot pressure generated in the first input pilot line and the pilot pressure generated in the second input pilot line to the output pilot line. The displacement control valve may control the variable displacement pump to increase the displacement of the variable displacement pump when the w differential pressure between the discharge pressure of the hydraulic oil discharged from the variable displacement pump and the pilot pressure generated in the output pilot line is smaller than the set pressure.

In such a structure, when the pilot pressure generated in the first input pilot line is higher than the pilot pressure generated in the second input pilot line, the shuttle valve allows the pilot pressure generated in the first input pilot line to be applied to the displacement control valve. Therefore, a desired displacement of the variable displacement pump is obtained to sufficiently secure the flow rate of the hydraulic oil discharged from the variable displacement pump to thereby sufficiently secure the discharge pressure of the hydraulic oil discharged from the variable displacement pump.

Advantageous Effects of Invention

The present invention makes it possible to prevent the driver from feeling the catch in turning back the steering wheel.

DESCRIPTION OF EMBODIMENTS

The following will describe an embodiment of the present invention in detail with reference to the drawings.

Figure 1:
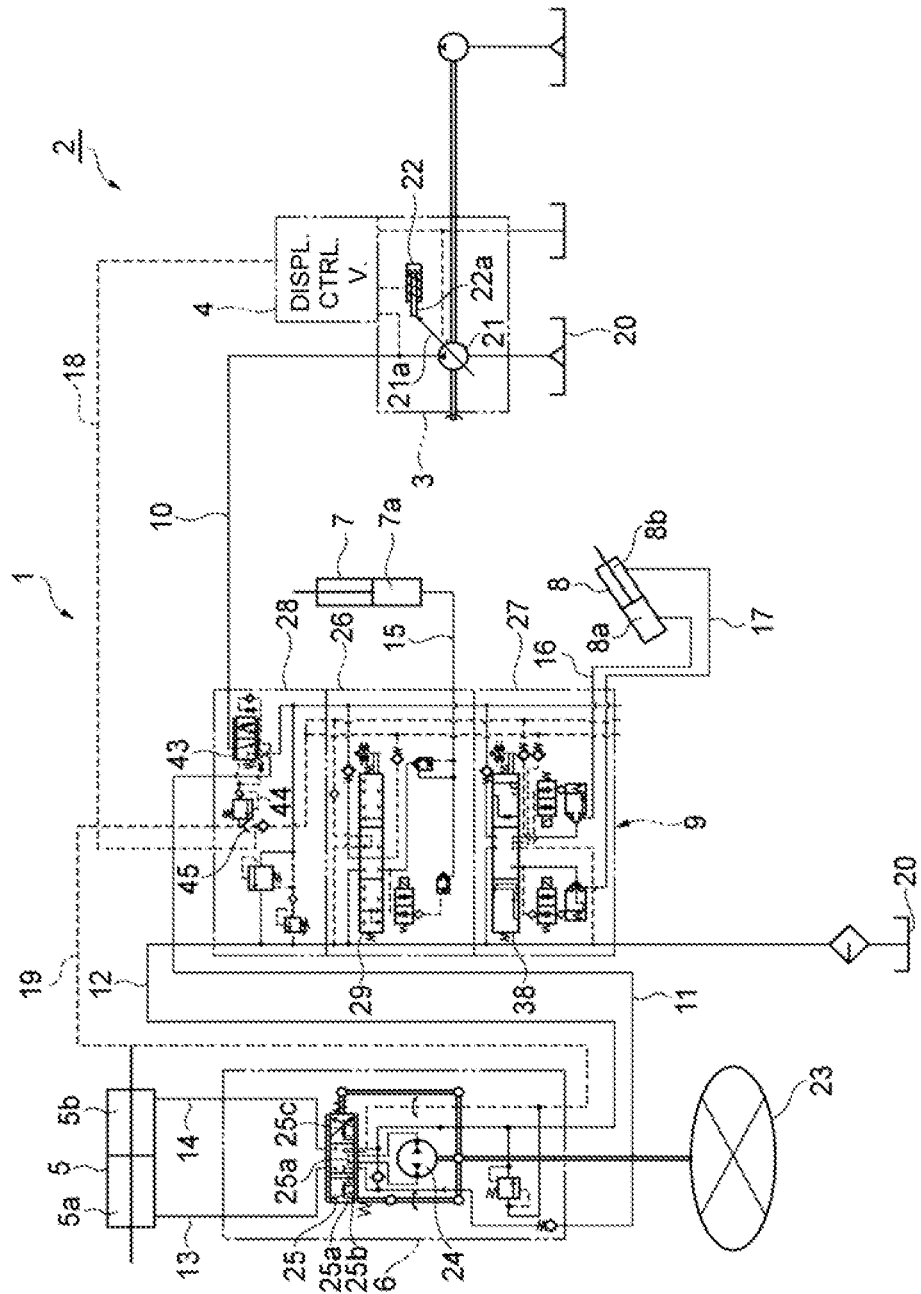
FIG. 1 is a hydraulic circuit diagram showing a hydraulic drive device for an industrial vehicle according to an embodiment of the present invention.

FIG. 1 is a hydraulic circuit diagram showing a hydraulic drive device for an industrial vehicle according to an embodiment of the present invention. In the figure, a hydraulic drive device 1 of the present embodiment is mounted to a forklift 2 that serves as an industrial vehicle.

The hydraulic drive device 1 includes a variable displacement pump 3 that discharges hydraulic oil, a displacement control valve 4 that controls the variable displacement pump 3, a power steering cylinder (PS cylinder) 5 that is driven by the hydraulic oil discharged from the variable displacement pump 3, a power steering valve (PS valve) 6 that is disposed between the variable displacement pump 3 and the PS cylinder 5, a lift cylinder 7 and a tilt cylinder 8 that are driven by the hydraulic oil discharged from the variable displacement pump 3, and an oil control valve (OCV) 9 that is disposed between the variable displacement pump 3, and the lift cylinder 7 and the tilt cylinder 8. The lift cylinder 7 and the tilt cylinder 8 form a loading cylinder.

The hydraulic drive device 1 includes a hydraulic oil passage 10 that connects the variable displacement pump 3 and the OCV 9, hydraulic oil passages 11 and 12 that each connect the OCV 9 and the PS valve 6, hydraulic oil passages 13 and 14 that each connect the PS valve 6 and the PS cylinder 5, a hydraulic oil passage 15 that connects the OCV 9 and the lift cylinder 7, hydraulic oil passages 16 and 17 that each connect the OCV 9 and the tilt cylinder 8, a pilot line 18 that connects the OCV 9 and the displacement control valve 4, and a pilot line 19 that connects the PS valve 6 and the OCV 9. The hydraulic oil passages 10, 11, and 13 to 17 are passages through which the hydraulic oil discharged from the variable displacement pump 3 flows. The hydraulic oil passage 12 is a passage that is connected to a tank 20 and through which the hydraulic oil discharged to the tank 20 flows.

The variable displacement pump 3 includes a pump body 21 that draws and discharges the hydraulic oil from the tank 20, and a cylinder 22 having a piston 22a fixed to a swash plate 21a of the pump body 21.

The displacement control valve 4 controls the variable displacement pump 3 to increase displacement of the variable displacement pump 3 when differential pressure between discharge pressure of the hydraulic oil discharged from the variable displacement pump 3 (hereinafter referred to as discharge pressure of the variable displacement pump 3) and pilot pressure generated in the pilot line 18 is smaller than a predetermined set pressure. At this time, the displacement control valve 4 controls the variable displacement pump 3 so that the displacement of the variable displacement pump 3 increases as the differential pressure between the discharge pressure of the variable displacement pump 3 and the pilot pressure generated in the pilot line 18 decreases.

The PS cylinder 5 is a double rod hydraulic cylinder. The PS valve 6 is a valve that switches directions in which the hydraulic oil flows according to an operation state of a steering wheel 23. The PS valve 6 includes an orbit pump 24 that rotates according to the operation state of the steering wheel 23, and a direction switching valve 25 whose position switches according to the operation state of the steering wheel 23. The hydraulic oil passage 13 connects the direction switching valve 25 and one hydraulic chamber 5a of the PS cylinder 5, and the hydraulic oil passage 14 connects the direction switching valve 25 and the other hydraulic chamber 5b of the PS cylinder 5.

The direction switching valve 25 is switched to any one of a neutral position (closed position) 25a for shutting off supply of the hydraulic oil from the variable displacement pump 3 to the PS cylinder 5, an open position 25b for allowing supply of the hydraulic oil from the variable displacement pump 3 to the hydraulic chamber 5a of the PS cylinder 5, and an open position 25c for allowing supply of the hydraulic oil from the variable displacement pump 3 to the hydraulic chamber 5b of the PS cylinder 5.

Figure 2:
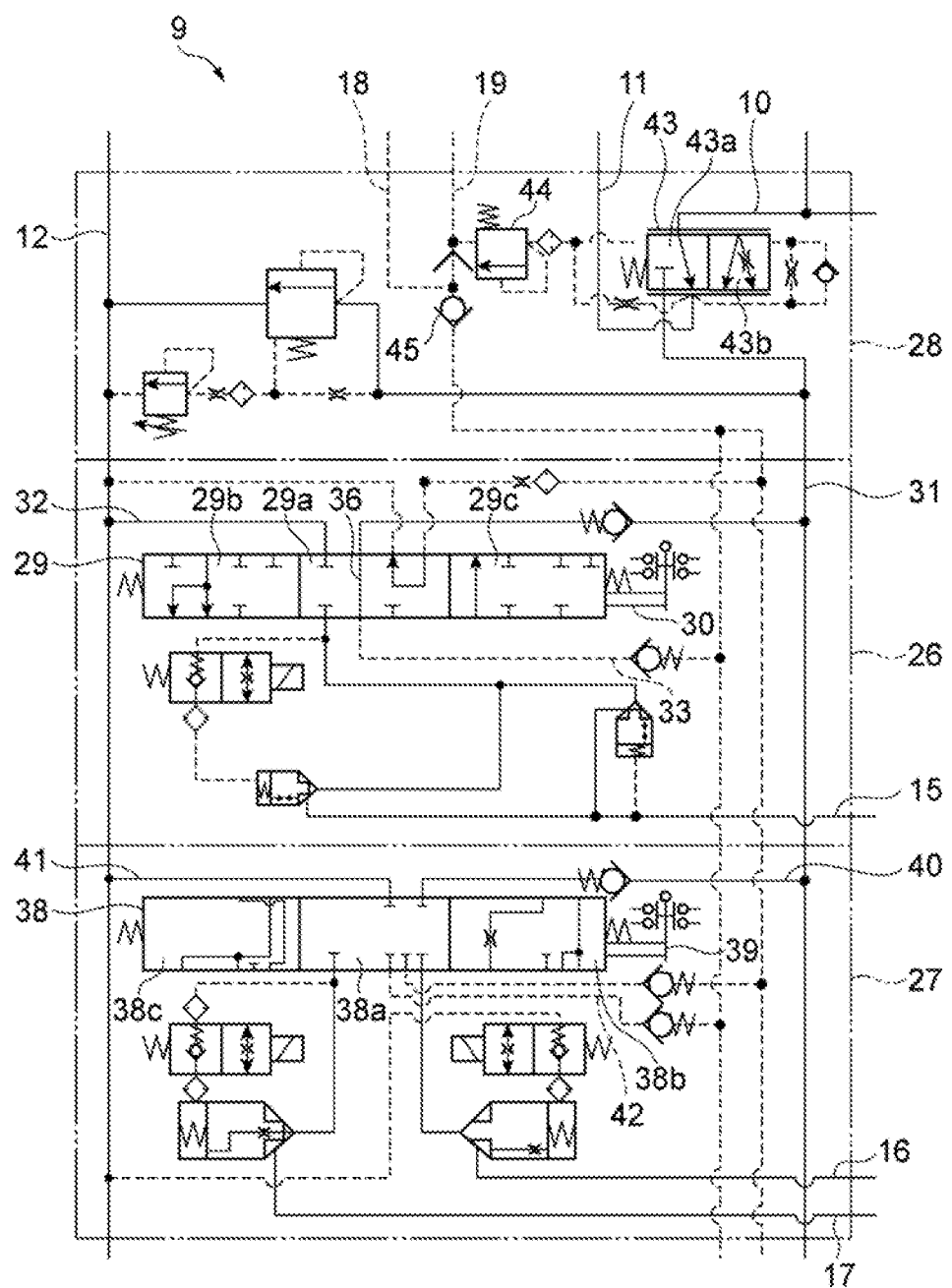
FIG. 2 is an enlarged hydraulic circuit diagram of an oil control valve shown in FIG. 1.

The OCV 9 has a lift section 26, a tilt section 27, and an inlet section 28 as also shown in FIG. 2.

The lift section 26 has a lift valve 29 disposed between the variable displacement pump 3 and the lift cylinder 7. The lift valve 29 forms a loading valve to which a lift operation lever 30 as a loading operation lever is connected.

The lift valve 29 is a direction switching valve that switches the directions in which the hydraulic oil flows according to an operation state of the lift operation lever 30.

The lift valve 29 is connected with hydraulic oil passages 31 and 32, the aforementioned hydraulic oil passage 15, and a pilot line 33. The hydraulic oil passage 31 is a passage that is connected to the hydraulic oil passage 10 via a priority valve 43 (described later) and through which the hydraulic oil discharged from the variable displacement pump 3 flows. The hydraulic oil passage 32 is a passage that is connected to the above-described hydraulic oil passage 12 and through which the hydraulic oil discharged from the lift cylinder 7 to the tank 20 flows. The hydraulic oil passage 15 connects the lift valve 29 and a bottom chamber 7a of the lift cylinder 7. The hydraulic oil discharged from the variable displacement pump 3 or the hydraulic oil discharged from the lift cylinder 7 to the tank 20 flows through the hydraulic oil passage 15. The pilot line 33 is connected to the above-described pilot line 18 via a shuttle valve 45 (described later).

The lift valve 29 is switched to any one of a neutral position (closed position) 29a for shutting off supply of the hydraulic oil from the variable displacement pump 3 to the lift cylinder 7, an open position 29b for allowing supply of the hydraulic oil from the variable displacement pump 3 to the lift cylinder 7, and an open position 29c for allowing discharge of the hydraulic oil from the lift cylinder 7 to the tank 20.

Figure 3:
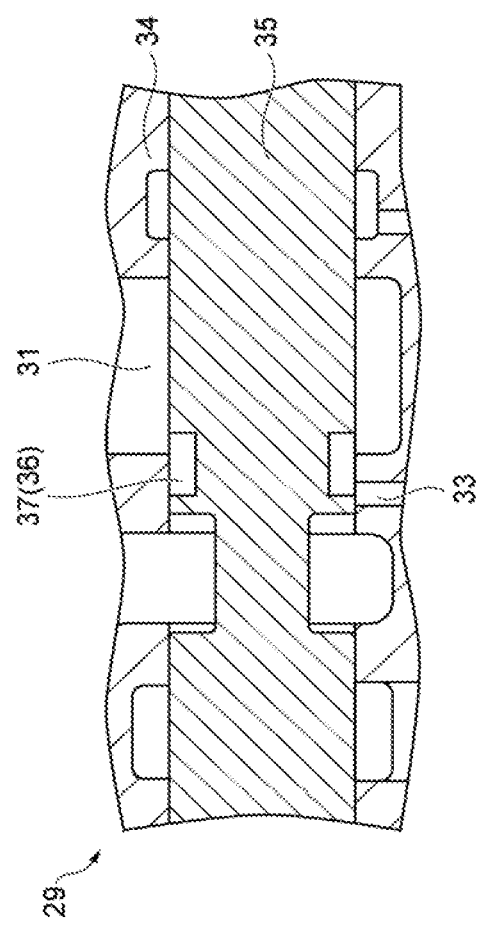
FIG. 3 is a cross-sectional view of a lift valve shown in FIG. 2.

The lift valve 29 has a housing 34 and a spool 35 slidable with respect to the housing 34, as shown in FIG. 3. In the outer peripheral surface of the spool 35, an annular groove portion 37 is provided. The groove portion 37 forms a communication passage 36 that makes communication between the hydraulic oil passage 31 and the pilot line 33 at the neutral position 29a of the lift valve 29 regardless of the positions of the direction switching valve 25 of the PS valve 6. That is, the communication passage 36 (groove portion 37) makes communication between the hydraulic oil passage 31 and the pilot line 33 at the neutral position 29a of the lift valve 29 even if the direction switching valve 25 of the PS valve 6 is located at any of the neutral position 25a, the open positions 25b, and 25c.

The tilt section 27 has a tilt valve 38 disposed between the variable displacement pump 3 and the tilt cylinder 8. The tilt valve 38 forms a loading valve to which a tilt operation lever 39 as a loading operation lever is connected. The tilt valve 38 is a direction switching valve that switches the directions in which the hydraulic oil flows according to an operation state of the tilt operation lever 39.

The tilt valve 38 is connected with hydraulic oil passages 40, 41, the aforementioned hydraulic oil passages 16, 17 and a pilot line 42. The hydraulic oil passage 40 is a passage that is connected to the hydraulic oil passage 31 and through which the hydraulic oil discharged from the variable displacement pump 3 flows. The hydraulic oil passage 41 is a passage that is connected to the above-described hydraulic oil passage 12 and through which the hydraulic oil discharged from the tilt cylinder 8 to the tank 20 flows. The hydraulic oil passage 16 connects the tilt valve 38 and a bottom chamber 8a of the tilt cylinder 8, and the hydraulic oil passage 17 connects the tilt valve 38 and a rod chamber 8b of the tilt cylinder 8. The hydraulic oil discharged from the variable displacement pump 3 or the hydraulic oil discharged from the tilt cylinder 8 to the tank 20 flows through the hydraulic oil passages 16 and 17. The pilot line 42 is connected to the pilot line 33.

The tilt valve 38 is switched to any one of a neutral position (closed position) 38a for shutting off supply of the hydraulic oil from the variable displacement pump 3 to the tilt cylinder 8, an open position 38b for allowing supply of the hydraulic oil from the variable displacement pump 3 to the bottom chamber 8a of the tilt cylinder 8, and an open position 38c for allowing supply of the hydraulic oil from the variable displacement pump 3 to the rod chamber 8b of the tilt cylinder 8.

The inlet section 28 has the priority valve 43 disposed between the variable displacement pump 3, and the PS valve 6, the lift valve 29, and the tilt valve 38, and a pressure control valve 44 that controls the priority valve 43.

The priority valve 43 is connected with the above-described hydraulic oil passages 10, 11, 31, and 40. The hydraulic oil passage 10 connects the variable displacement pump 3 and the priority valve 43. The hydraulic oil passage 11 connects the priority valve 43 and the PS valve 6. The hydraulic oil passages 31 and 40 connect the priority valve 43, and the lift valve 29 and the tilt valve 38. The hydraulic oil passages 10 and 11 form a first hydraulic oil passage that connects the variable displacement pump 3 and the PS valve 6. The hydraulic oil passages 10, 31, and 40 form a second hydraulic oil passage that connects the variable displacement pump 3, and the lift valve 29 and the tilt valve 38.

The priority valve 43 is a switching valve that is switched to any one of an open position 43a for supplying the hydraulic oil from the variable displacement pump 3 to the PS valve 6 mainly through the hydraulic oil passage 11, and an open position 43b for supplying the hydraulic oil from the variable displacement pump 3 to the PS valve 6 through the hydraulic oil passage 11 and to the lift valve 29 and the tilt valve 38 through the hydraulic oil passages 31 and 40. Even when the priority valve 43 is located at the open position 43a, the hydraulic oil leaks from the gap of the priority valve 43 into the hydraulic oil passage 31, and the hydraulic oil flows through the hydraulic oil passages 31, 40 toward the lift valve 29 and the tilt valve 38.

The pressure control valve 44 controls the priority valve 43 to supply the hydraulic oil from the variable displacement pump 3 to the PS valve 6 preferentially.

The inlet section 28 has a shuttle valve 45 disposed between the displacement control valve 4, and the PS valve 6, the lift valve 29 and the tilt valve 38. The shuttle valve 45 is connected with the aforementioned pilot lines 18, 19, 33, and 42. The pilot line 19 forms a first input pilot line that connects the shuttle valve 45 and the PS valve 6, The pilot lines 33 and 42 form a second input pilot line that connects the shuttle valve 45, and the lift valve 29 and the tilt valve 38, The pilot line 18 forms an output pilot line that connects the shuttle valve 45 and the displacement control valve 4.

The shuttle valve 45 outputs higher pilot pressure of the pilot pressure generated in the pilot line 19 and pilot pressure generated in the pilot line 33 to the pilot line 18.

In the hydraulic drive device 1 configured as described above, when the steering wheel 23 is operated, the priority valve 43 is maintained at the open position 43a (in the figure), and the direction switching valve 25 of the PS valve 6 is switched from the neutral position 25a (in the figure) to the open position 25b or the open position 25c. Then, the hydraulic oil discharged from the variable displacement pump 3 is supplied to one of the hydraulic chambers 5a and 5b of the PS cylinder 5 through the hydraulic oil passage 10, the priority valve 43, the hydraulic oil passage 11, the PS valve 6, and one of the hydraulic oil passages 13 and 14 to thereby drive the PS cylinder 5 to one side.

At this time, since pilot pressure corresponding to the discharge pressure of the variable displacement pump 3 is generated in the pilot line 19, the pilot pressure in the pilot line 19 exceeds the pilot pressure in the pilot line 33, Since the shuffle valve 45 allows the pilot pressure in the pilot line 19 to be applied to the displacement control valve 4 through the pilot line 18, the differential pressure between the discharge pressure of the variable displacement pump 3 and the pilot pressure generated in the pilot line 18 falls below the set pressure, and the displacement control valve 4 controls the variable displacement pump 3 to secure the displacement of the variable displacement pump 3. Therefore, a necessary flow rate of the hydraulic oil is discharged from the variable displacement pump 3 to secure the discharge pressure of the variable displacement pump 3.

When the lift operation lever 30 is operated in a lifting direction, the priority valve 43 switches from the open position 43a (in the figure) to the open position 43b, and the lift valve 29 switches from the neutral position 29a (in the figure) to the open position 29b. Then, the hydraulic oil discharged from the variable displacement pump 3 is supplied to the lift cylinder 7 through the hydraulic oil passage 10, the priority valve 43, the hydraulic oil passage 31, the lift valve 29, and the hydraulic oil passage 15 to thereby extensionally drive the lift cylinder 7.

At this time, since the pilot pressure corresponding to the discharge pressure of the variable displacement pump 3 is generated in the pilot line 33, the pilot pressure in the pilot line 33 exceeds the pilot pressure in the pilot line 19. Since the shuttle valve 45 allows the pilot pressure in the pilot line 33 to be applied to the displacement control valve 4 through the pilot line 18, the differential pressure between the discharge pressure of the variable displacement pump 3 and the pilot pressure generated in the pilot line 18 falls below the set pressure, and the displacement control valve 4 controls the variable displacement pump 3 to secure the displacement of the variable displacement pump 3. Therefore, a necessary flow rate of the hydraulic oil is discharged from the variable displacement pump 3 to secure the discharge pressure of the variable displacement pump 3.

Here, when the steering wheel 23 is turned back, the priority valve 43 is maintained at the open position 43a (in the figure), and the direction switching valve 25 of the PS valve 6 is switched from one of the open positions 25b and 25c to the other. At this time, the direction switching valve 25 is temporarily located at the neutral position 25a (in the figure) not to supply the hydraulic oil from the variable displacement pump 3 to the PS cylinder 5. Therefore, the pilot pressure in the pilot line 19 decreases.

When the priority valve 43 is located at the open position 43a (in the figure), however, the hydraulic oil from the variable displacement pump 3 leaks from the priority valve 43 and flows to the lift valve 29. The hydraulic oil leaked from the priority valve 43 reaches the pilot line 33 through the communication passage 36 (groove portion 37) of the lift valve 29. Since a desired pilot pressure is generated in the pilot line 33, the pilot pressure in the pilot line 33 exceeds the pilot pressure in the pilot line 19. Thus, the shuttle valve 45 allows the pilot pressure in the pilot line 33 to be applied to the displacement control valve 4 through the pilot line 18. Therefore, the differential pressure between the discharge pressure of the variable displacement pump 3 and the pilot pressure generated in the pilot line 18 falls below the set pressure, and the displacement control valve 4 controls the variable displacement pump 3 to suppress the displacement of the variable displacement pump 3 from decreasing. Thus, decrease in the flow rate of the hydraulic oil discharged from the variable displacement pump 3 is suppressed, and decrease in the discharge pressure of the variable displacement pump 3 is suppressed.

Then, when the direction switching valve 25 of the PS valve 6 is located at the other of the open positions 25b and 25c, the hydraulic oil from the variable displacement pump 3 is supplied to the other of the hydraulic chambers 5a and 5b of the PS cylinder 5 to thereby drive the PS cylinder 5 to the other side.

As described above, in the present embodiment, the spool 35 of the lift valve 29 is provided with the groove portion 37 that forms the communication passage 36 that makes communication between the hydraulic oil passage 31 and the pilot line 33 at the neutral position 29a of the lift valve 29 when the PS valve 6 is located in a neutral position. Therefore, even if the steering wheel 23 is turned back to temporarily locate the PS valve 6 in the neutral state, the hydraulic oil passage 31 and the pilot line 33 communicate with each other through the communication passage 36, so that a desired pilot pressure is generated in the pilot line 33. The pilot pressure generated in the pilot line 33 is applied to the displacement control valve 4 through the pilot line 18. At this time, the displacement control valve 4 controls the variable displacement pump 3 to increase the displacement of the variable displacement pump 3 when the differential pressure between the discharge pressure of the variable displacement pump 3 and the pilot pressure generated in the pilot line 18 is smaller than the set pressure. Therefore, when the desired pilot pressure is generated in the pilot line 18, the differential pressure between the discharge pressure of the variable displacement pump 3 and the pilot pressure generated in the pilot line 18 falls below the set pressure to thereby secure the displacement of the variable displacement pump 3. As a result, the flow rate of the hydraulic oil discharged from the variable displacement pump 3 is secured to secure the discharge pressure of the variable displacement pump 3. Therefore, when the PS valve 6 is opened from the neutral state to the opposite side, power supplied to the PS cylinder 5 is secured. This prevents the driver from feeling a catch when the driver turns back the steering wheel 23.

In the present embodiment, when the priority valve 43 is located at a position where the hydraulic oil from the variable displacement pump 3 is supplied to the PS valve 6 mainly through the hydraulic oil passage 11, the hydraulic oil leaking from the priority valve 43 is supplied to the lift valve 29 and the tilt valve 38 through the hydraulic oil passages 31 and 40. In this case, it is easy to perform operation of slightly moving the lift cylinder 7 by fine operation of the lift operation lever 30 and operation of slightly moving the tilt cylinder 8 by fine operation of the tilt operation lever 39.

In the present embodiment, the groove portion 37 forming the communication passage 36 is provided in the spool 35 of the lift valve 29. Since the structure of the lift valve 29 is simpler than the structure of the tilt valve 38, it is easy to form the groove portion 37 in the spool 35 of the lift valve 29.

In the present embodiment, when the pilot pressure generated in the pilot line 19 is higher than the pilot pressure generated in the pilot line 33, the shuttle valve 45 allows the pilot pressure generated in the pilot line 19 to be applied to the displacement control valve 4 through the pilot line 18. Therefore, a desired displacement of the variable displacement pump 3 is obtained to sufficiently secure the flow rate of the hydraulic oil discharged from the variable displacement pump 3 to thereby sufficiently secure the discharge pressure of the variable displacement pump 3.

It is noted that the present invention is not limited to the above-described embodiment. For example, the communication passage 36 that makes communication between the hydraulic oil passage 31 and the pilot line 33 at the neutral position 29a of the lift valve 29 may be provided with an orifice for reducing a cross-sectional area of the communication passage 36. This further facilitates the operation of slightly moving the tilt cylinder 8 by the fine operation of the tilt operation lever 39.

Although in the above-described embodiment the shuttle valve 45 is disposed between the displacement control valve 4, and the PS valve 6 and the lift valve 29, such a shuttle valve 45 may not be particularly provided. The pilot pressure generated in the pilot line 33 may be constantly applied to the displacement control valve 4 through the pilot line 18. In this case, since the number of parts is reduced, it is possible to reduce the cost.

In the above-described embodiment, the spool 35 of the lift valve 29 is provided with the groove portion 37 that forms the communication passage 36 that makes communication between the hydraulic oil passage 31 and the pilot line 33 at the neutral position 29a of the lift valve 29 regardless of the positions of the PS valve 6. The present invention is not particularly limited to this form, but the communication passage 36 may make communication between the hydraulic oil passage 31 and the pilot line 33 at the neutral position 29a of the lift valve 29 only when the PS valve 6 is located in the neutral position.

In the above-described embodiment, the spool 35 of the lift valve 29 is provided with the groove portion 37 that forms the communication passage 36 that makes communication between the hydraulic oil passage 31 and the pilot line 33 at the neutral position 29a of the lift valve 29. However, the groove portion 37 forming such a communication passage 36 may be provided in a spool of the tilt valve 38. If the hydraulic drive device 1 includes an attachment cylinder, the groove portion 37 that forms the communication passage 36 may be provided in a spool of an attachment valve disposed between the variable displacement pump 3 and the attachment cylinder.

REFERENCE SIGNS LIST 1 hydraulic drive device
2 forklift (industrial vehicle)
3 variable displacement pump
4 displacement control valve
5 power steering cylinder (PS cylinder)
6 power steering valve (PS valve)
7 lift cylinder (loading cylinder)
8 tilt cylinder (loading cylinder)
10 hydraulic oil passage (first hydraulic oil passage second hydraulic oil passage)
11 hydraulic oil passage (first hydraulic oil passage)
18 pilot line (output pilot line)
19 pilot line (first input pilot line)
23 steering wheel
29 lift valve (loading valve)
29a neutral position
30 lift operation lever (loading operation lever)
31 hydraulic oil passage (second hydraulic oil passage)
33 pilot line (second input pilot line)
35 spool
36 communication passage
37 groove portion
38 tilt valve (loading valve)
39 tilt operation lever (loading operation lever)
40 hydraulic oil passage (second hydraulic oil passage)
42 pilot line (second input pilot line)
43 priority valve (switching valve)
43a, 43b open position
45 shuttle valve

The invention claimed is:

1. A hydraulic drive device for an industrial vehicle comprising:
   a variable displacement pump that discharges hydraulic oil;
   a displacement control valve that controls the variable displacement pump;
   a power steering cylinder that is driven by the hydraulic oil discharged from the variable displacement pump;
   a power steering valve that is disposed between the variable displacement pump and the power steering cylinder to switch directions in which the hydraulic oil flows according to an operation state of a steering wheel;
   a loading cylinder that is driven by the hydraulic oil discharged from the variable displacement pump;
   a loading valve that is disposed between the variable displacement pump and the loading cylinder to switch directions in which the hydraulic oil flows according to an operation state of a loading operation lever;
   a first hydraulic oil passage that connects the variable displacement pump and the power steering valve and through which the hydraulic oil discharged from the variable displacement pump flows;
   a second hydraulic oil passage that connects the variable displacement pump and the loading valve and through which the hydraulic oil discharged from the variable displacement pump flows; and
   a pilot line that connects the loading valve and the displacement control valve,
   wherein
   the displacement control valve controls the variable displacement pump to increase displacement of the variable displacement pump when differential pressure between discharge pressure of the hydraulic oil discharged from the variable displacement pump and pilot pressure generated in the pilot line is smaller than a predetermined set pressure, and
   a spool of the loading valve is provided with a groove portion that forms a communication passage that makes communication between the second hydraulic oil passage and the pilot line at a neutral position of the loading valve when the power steering valve is located in a neutral position.

2. The hydraulic drive device for the industrial vehicle according to claim 1, further comprising a switching valve that is disposed between the variable displacement pump, and the power steering valve and the loading valve, and is switched to any one of a position for supplying the hydraulic oil from the variable displacement pump to the power steering valve mainly through the first hydraulic oil passage, and a position for supplying the hydraulic oil from the variable displacement pump to the power steering valve and the loading valve through the first hydraulic oil passage and the second hydraulic oil passage.

3. The hydraulic drive device for the industrial vehicle according to claim 1, wherein
   the loading cylinder is a lift cylinder,
   the loading valve is a lift valve disposed between the variable displacement pump and the lift cylinder, and
   the groove portion is provided in the spool of the lift valve.

4. The hydraulic drive device for the industrial vehicle according to claim 1, further comprising
   a shuttle valve that is disposed between the power steering valve and the loading valve, and the displacement control valve, and
   a first input pilot line that connects the shuttle valve and the power steering valve,
   wherein the pilot line includes a second input pilot line that connects the shuttle valve and the loading valve, and an output pilot line that connects the shuttle valve and the displacement control valve,
   wherein the shuttle valve outputs higher pilot pressure of the pilot pressure generated in the first input pilot line and the pilot pressure generated in the second input pilot line to the output pilot line, and
   wherein the displacement control valve controls the variable displacement pump to increase the displacement of the variable displacement pump when the differential pressure between the discharge pressure of the hydraulic oil discharged from the variable displacement pump and the pilot pressure generated in the output pilot line is smaller than the set pressure.

* * * * *